Nov. 3, 1931.   H. C. LORD   1,830,118
VIBRATION DAMPENER
Filed Sept. 17, 1927

INVENTOR
Hugh C. Lord

Patented Nov. 3, 1931

1,830,118

UNITED STATES PATENT OFFICE

HUGH C. LORD, OF ERIE, PENNSYLVANIA

VIBRATION DAMPENER

Application filed September 17, 1927. Serial No. 220,156.

Periodic vibration in running machinery creates objectionable noise and sensations. A very slight vibration is quite noticeable. In order to dampen such vibrations it is desirable to permit of a limited freedom of movement of the apparatus. The difficulty encountered with many devices which are subjected to not only the vibrations incident to the operation of the device but also other shocks and loads is to give to the device, or mounting, sufficient stability to take care of the load and running conditions without largely neutralizing the dampening effect. If the load is supported by rubber under compression the dampening capacity is reduced as the compression is increased, using the term "compression" in the sense that it is usually used in connection with rubber and if stability is desired sufficient compression is usually necessary to largely prevent relative vibration, or dampening. In the dampeners heretofore invented by me and disclosed in applications Serial Number 160,223, filed Jan. 10th, 1927, now Patent No. 1,778,503 issued Oct. 14, 1930, and Serial Number 170,521, filed Feb. 24th, 1927, the load is carried by the rubber under tension and shear, preferably both and this adds very much to the possibility of giving dampening effect and at the same time a reasonable stability.

The present invention is designed to permit of a dampening support with extreme freedom throughout a limited range with an abrupt increase in resistance to movement beyond this range so that a very sensitive mounting may be used through the vibration range with sufficient limiting factors to prevent extreme movement. Features and details of the invention will appear from the specification and claims.

A preferred embodiment of the invention is illustrated in the accompanying drawings as follows:—

Figure 1:
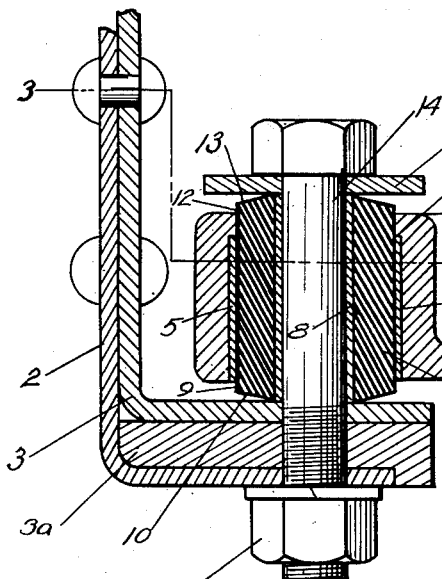
Fig. 1 shows a vertical section on the line 1—1 in Fig. 3, the device being shown in the position assumed under normal load.
Figure 3:
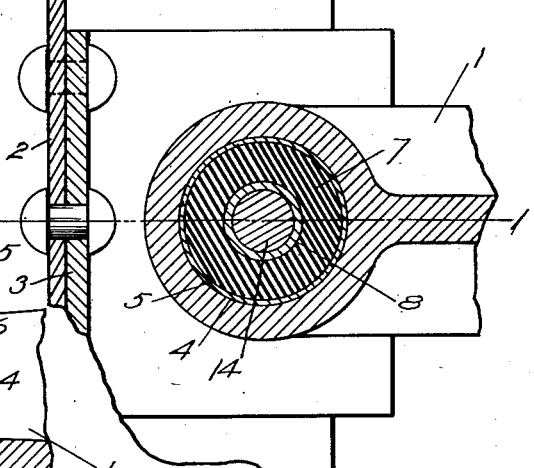

Fig. 3 a section on the line 3—3 in Fig. 1.

Figure 4:
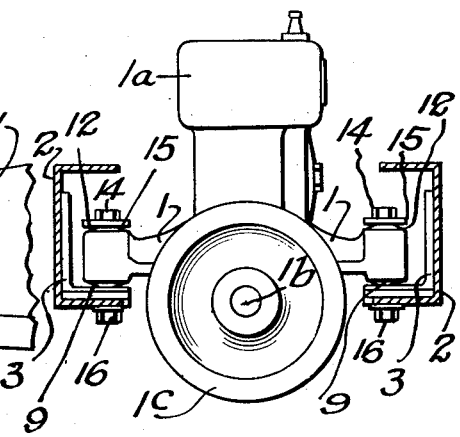

Fig. 4 an end view of an automobile motor supported in its frame.

1 marks a supported member, such as an arm extending from an automobile motor 1a having a crank shaft 1b and fly wheel 1c, 2 a supporting member, such as a side frame of an automobile, and 3 a bracket secured to the side frame.

The supported member 1 has an opening 4 receiving a metallic shell 5. The upper end of the opening 4 is provided with a shoulder 6 against which the shell abuts. A rubber wall 7 extends from the shell 5 to a sleeve, or hollow pin 8. This rubber is preferably bonded to the shell and pin and is under initial tension. This may be accomplished by vulcanizing the rubber in place and placing the rubber under tension as the rubber shrinks as it cools in vulcanization. Thus the normal load is held by the rubber under tension and may be made as yielding, or as soft as may be desired, that is to say, the rubber may be increased in length increasing the rate of increase of resistance to movement, or it may be made shorter thus reducing the rate of increase of resistance and the same effects may be accomplished by increasing the diameter of the shell and the radial dimensions of the wall.

The rubber extends at 9 slightly below the end of the shell 5 and terminates in a tapered face 10. The rubber is extended at 12 above the shell, the extension 12 being somewhat longer than at the bottom in order to carry it above the top of the supported member 1. It is provided with a tapered face 13. It will be understood that these faces are formed with relation to the shape assumed by the rubber under its normal load and it is so shown in Fig. 1. A bolt 14 extends through the sleeve 8. It is provided with a washer 15 which rests on the top of the pin 8. The lower end of the pin 8 rests on the horizontal portion of the bracket 3 and the bolt is preferably screwed through the bracket and frame and secured with a nut 16, an insert 3a being preferably provided to give sufficient thickness for a thread for the bolt.

Figure 2:
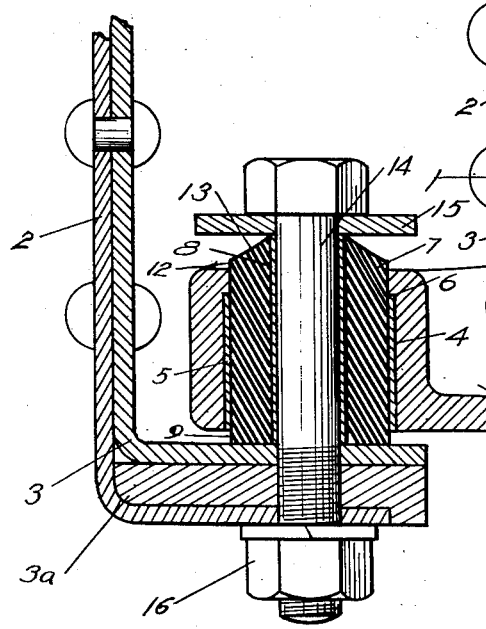
Fig. 2 shows a view similar to Fig. 1 showing the position of the parts under shock.

It will be noted that in the exemplification shown the load is carried initially entirely by the tension of the rubber and in shear acting with a radial dimension between the shell and the pin. It is in effect a resilient diaphragm. When, however, the load is increased through shock the supported member is forced downwardly as shown in Fig. 2. The face 10 seats on the bracket and the rubber extension 9 is subjected to compression. This compression is communicated to the rubber wall under tension and the strain, or distortion is localized largely near the shell. The result is that the rate of increase of resistance to movement abruptly changes and becomes much greater. The same condition operates with relation to the top extension in resisting upward throw of the supported member.

It will be observed that the free movement, as it may be termed, prior to the seating of the surface 10 may be made anything desired by varying the contour of the surface 10. Further the abruptness, or rate of increase of resistance may be varied by increasing, or decreasing the extensions 9 and 12. As this extension is increased the rate of increase in resistance becomes less because the strain is less localized on the rubber in the shell. Again the relation may be varied by changing the diameter of the shell. With a larger diameter and a greater span of rubber carrying the load under tension, the rate of increase of resistance is reduced but with the same extension there is a greater quantity of rubber which is subjected to the localized strain and consequently the rate of increase after the face 10, or 12 bottoms is made greater and also is of greater capacity for receiving violent shocks. Thus it is possible to accomplish in practice any theoretical line of performance that may be desired.

While I have shown the free movement top and bottom as equal it will be understood that this may be varied as circumstances indicate and it will also be understood that I have exaggerated in the drawings what would ordinarily be the desirable free movement, or vibration range.

What I claim as new is:—

1. A vibration dampening member comprising an outer shell, a central pin, an intervening wall of rubber bonded to the central pin by surface bonding, and an extension of the wall of rubber beyond the shell adjacent to the shell forming a bottoming seat, the central pin projecting beyond the periphery of the rubber extension, the rubber being inclined when released between the periphery of the extension and the end of the pin.

2. A vibration dampening member comprising an outer shell, a central pin, an intervening wall of rubber bonded to the central pin and outer shell by surface bonding, and an extension of the wall of rubber beyond the shell adjacent to the shell forming a bottoming seat, the central pin projecting beyond the periphery of the rubber extension, the rubber being inclined when released between the periphery of the extension and the end of the pin.

3. A vibration dampening member comprising an outer shell, a central pin, an intervening wall of rubber bonded to the central pin and outer shell by surface bonding during vulcanization, said intervening wall of rubber being under initial tension, and an extension of the wall of rubber beyond the shell adjacent to the shell forming a bottoming seat, the central pin projecting beyond the periphery of the rubber extension, the rubber being inclined when released between the periphery of the extension and the end of the pin.

4. A dampening member between supported and supporting members comprising a metal annular member; a metal inner member within the annular member, said members presenting opposing walls; a rubber means between the supported and supporting members and forming a wall between and secured to the opposing walls of said supported and supporting members carrying the load under shear, said rubber means having a bottoming face; and a bottoming device, said means acting with the bottoming device interposing a resistance to movement beyond a limited vibration movement, said bottoming face and bottoming device being inclined to each other when the rubber means is relieved of tension.

5. In a vibration dampener, the combination of a supported and a supporting member, one of said members having a shouldered opening; a dampener in the opening comprising a shell resting against the shoulder, a central member, and an intervening wall of rubber, the rubber having a bottoming extension projecting past the shoulder; and a bottoming device engaged by the extension.

6. A vibration dampening member comprising an outer detachable tubular shell adapted for insertion into an opening; a central member; an intervening wall of rubber; and a bottoming extension of the rubber beyond the shell adjacent to the shell, the rubber being inclined when free between the periphery of the extension and the end of the pin.

7. In a vibration dampening mounting, the combination of a rigid supporting member; a supported member, said members having directly opposing spaced walls and a wall extending transversely thereto, one of said members being subjected to periodic vibrations and having a substantially rigid connection to the source of such vibration; and rubber means between and united to the faces of said opposing walls by surface bonding, said rubber means being uncompressed between said walls, said means sustaining the load through the shear of the rubber between said faces, said rubber means engaging said transverse wall and interposing compression resistance to an extended shear movement.

8. In a vibration dampening mounting, the combination of a rigid supporting member; a supported member, said members having directly opposing spaced walls and a wall extending transversely thereto, one of said members being subjected to periodic vibrations and having a substantially rigid connection to the source of such vibration; and rubber means between and united to the faces of said opposing walls by surface bonding, said rubber means being under initial tension between said opposing walls, said means sustaining the load through the shear of the rubber between said faces, said rubber means engaging said transverse wall and interposing compression resistance to an extended shear movement.

9. A vibration dampening member comprising an outer shell; a central member; and an intervening wall of rubber bonded to the central member and outer shell by surface bonding, said rubber having a bottoming face inclined when free.

10. In a vibration dampener, the combination of a supported member; a supporting member, one of said members being subjected to periodic vibrations; and a resilient rubber element forming a rubber tension connection under load between said members, said element having a comparatively small resistance to movement between the members for a limited vibration range, and said element and one of the members having portions cooperating to produce a high rate of increase in resistance as compared with the rate of increase in the vibration range and interposing a greater resistance to relative movement of the members beyond the vibration range.

11. In a vibration dampener, the combination of a supported member; a supporting member, one of said members being subjected to periodic vibrations; and a resilient rubber element forming a rubber tension connection under load between said members, said element having a comparatively small resistance to movement between the members for a limited vibration range, and said element and one of the members having portions including an extension of the element beyond one of the members cooperating to produce a high rate of increase in resistance as compared with the rate of increase in the vibration range and interposing a greater resistance to relative movement of the members beyond the vibration range.

12. In a vibration dampener, the combination of a supported member, a supporting member, one of said members being subjected to periodic vibrations; and a resilient rubber element under initial tension forming a connection between said members, said element having a comparatively small resistance to movement between the members for a limited vibration range, and said element and one of the members having portions cooperating to produce a high rate of increase in resistance as compared with the rate of increase in the vibration range and interposing a greater resistance to relative movement of the members beyond the vibration range.

13. In a vibration dampener, the combination of a supported member; a supporting member, said members having directly opposing faces; and a resilient rubber element interposed between said faces and in securing engagement therewith and resisting the major vibratory thrust through shear of the rubber, said element having a comparatively small resistance to movement between the members for a limited vibration range, and said element and one of the members having portions cooperating to produce a high rate of increase in resistance as compared with the rate of increase in the vibration range and interposing a greater resistance to relative movement of the members beyond the vibration range.

14. In a vibration dampener, the combination of a supported member; a supporting member, one of the members having opposite sides and the other member being interposed between said opposite sides; and a resilient rubber element interposed between the intermediate member and the opposite sides and in securing engagement therewith and sustaining the major thrust through shear of the rubber, said element having a comparatively small resistance to movement between the members for a limited vibration range and said element and one of the members having portions cooperating to produce a high rate of increase in resistance as compared with the rate of increase in the vibration range and interposing a greater resistance to relative movement of the members beyond the vibration range.

15. In a vibration dampener, the combination of a supported member; a supporting member, one of the members having opposite sides and the other member being interposed between said opposite sides; and a resilient rubber element interposed between the intermediate member and the opposite sides and secured thereto by bonding and sustaining the major thrust through tension of the rubber, said element having a comparatively small resistance to movement between the members for a limited vibration range and said element and one of the members having portions cooperating to produce a high rate of increase in resistance as compared with the rate of increase in the vibration range and interposing a greater resistance to relative movement of the members beyond the vibration range.

16. In a vibration dampener, the combination of a supported member; a supporting member, one of the members having opposite sides and the other member being interposed between said opposite sides; and a resilient rubber element interposed between the intermediate member and the opposite sides and secured thereto by bonding and sustaining the major thrust through the initial tension of the rubber, said element having a comparatively small resistance to movement between the members for a limited vibration range and said element and one of the members having portions cooperating to produce a high rate of increase in resistance as compared with the rate of increase in the vibration range and interposing a greater resistance to relative movement of the members beyond the vibration range.

17. In a vibration dampener, the combination of a supported and a supporting member, one of said members being provided with periodic vibration producing means and the other of said members being insulated therefrom, said members having a normally fixed relation except for such vibrations, one of said members having an annular wall and the other forming an inner wall within the annular wall forming extended opposing surfaces in substantial alinement with the major thrust under vibration between the members; and a mounting of resilient rubber in tension-resisting engagement with the opposing surfaces and resisting the major thrust through shearing action on the rubber between its surfaces and the respective opposing surfaces of said member, the rubber being directly interposed between the engaging surfaces and of greater length on the inner wall than on the surrounding wall.

18. In a vibration dampener, the combination of a supported and a supporting member, one of said members being provided with periodic vibration producing means and the other of said members being insulated therefrom, said members having a normally fixed relation except for such vibrations, one of said members having an annular wall forming extended opposing surfaces in substantial alinement with the major thrust under vibration between the members; and a mounting of resilient rubber, said rubber being bonded to said surfaces by vulcanization and resisting the major thrust through shearing action on the rubber between its surfaces and the respective opposing surfaces of said member, the rubber being directly interposed between the engaging surfaces and of greater length on the inner wall than on the surrounding wall at least equalizing the mass of rubber adjacent to the inner member with the mass of rubber adjacent to the outer wall.

In testimony whereof I have hereunto set my hand.

HUGH C. LORD.